No. 722,825. PATENTED MAR. 17, 1903.
W. J. ESTER.
COMBINATION ICE SPUD AND SHOVEL.
APPLICATION FILED MAR. 21, 1902.
NO MODEL.

Witnesses:
A. C. Cruit.
J. E. Hutchinson Jr.

Inventor:
W. J. Ester,
By Pennie & Goldsborough
assoc. attys.

UNITED STATES PATENT OFFICE.

WILLIAM J. ESTER, OF ROCHESTER, NEW YORK.

COMBINATION ICE-SPUD AND SHOVEL.

SPECIFICATION forming part of Letters Patent No. 722,825, dated March 17, 1903.

Application filed March 21, 1902. Serial No. 99,349. (No model.)

*To all whom it may concern:*

Be it known that I, WILLIAM J. ESTER, a citizen of the United States, residing at Rochester, in the county of Monroe and State of New York, have invented a new and useful Combination Ice-Spud and Shovel, of which the following is a specification.

The invention relates to a combination shovel and ice-spud, and has for its object to provide an implement of this description that can be readily and conveniently changed from one to the other, as occasion may require.

The invention consists of a handle having permanently fixed to the lower end thereof an ice-spud, a shovel-blade adapted to be detachably secured to the handle, and means for locking the handle and blade in their attached positions.

The invention also consists of certain details and combinations of the same, as will be hereinafter fully described and claimed.

Figure 1:
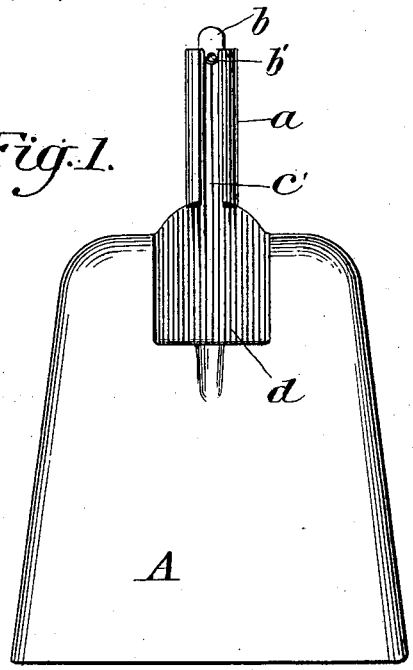
Figure 2:
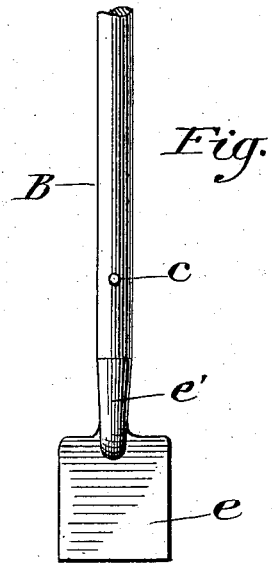
Figure 3:
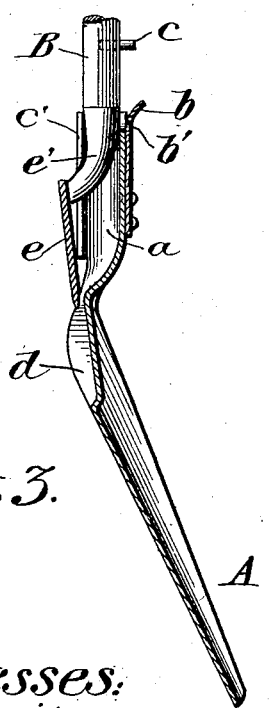
Figure 4:
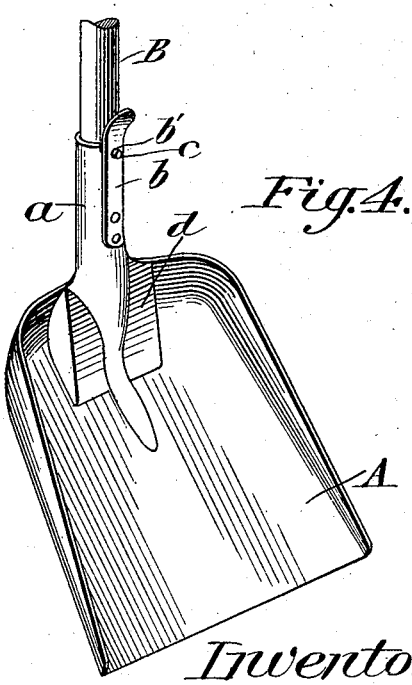

Referring to the drawings, Figure 1 is a rear elevation of the shovel-blade and its shank, showing the handle detached. Fig. 2 is a front elevation of the ice-spud and its handle. Fig. 3 is a vertical sectional view of the shovel-blade, showing the handle entering the shank of the shovel-blade. Fig. 4 is a perspective view of the shovel-blade and handle attached.

In the drawings, A represents the shovel-blade, provided with a hollow shank $a$ and having a pocket or depression $d$ formed in the rear thereof directly below the hollow shank. This pocket or depression I provide for the purpose of receiving the ice-spud or other tool $e$ when the handle B is fastened to the shovel-blade.

The handle B is of the ordinary type, preferably made of wood, and having fixedly secured to its lower end the ice-spud $e$ by means of a curved metal neck $e'$, formed on the ice-spud.

Rigidly fastened to the front of the shank $a$ and at a point near the lower end thereof is a spring-arm $b$, which is free at its upper end to be pulled outward as occasion may demand and is preferably curved at its upper end, so as to allow the operator to easily grip the arm when he desires to unfasten the same to withdraw the handle from the shank $a$. In the upper free end of the spring-arm, directly below the point where the same begins to curve outward, is a hole or perforation $b'$, which is adapted to receive a pin $c$, mounted on the lower end of the handle, when the handle is inserted wholly within the hollow shank $a$. At the front of the shank and at the upper end thereof I cut away a portion of the same to form a passage-way for the pin $c$, and thus serve to guide the pin to the perforation in the handle. By this means the handle is securely fastened to the shovel-blade.

To permit of the handle being inserted into the hollow shank, it is necessary that some provision be made to allow the tool, which is rigidly secured to the lower end of the handle, to pass upon the outside of the shank, the tool being of too great a size to be inserted within the shank together with the handle. In order to provide for this, I form a slot, as at $c'$, in the rear side of the shank, which extends throughout its length. This will allow the curved neck, which is of less diameter than the width of the slot, to pass down through the same, and thus permit of the ice-spud passing upon the outside of the shank, the neck being so curved that the spud lies a slight degree to one side of the direct line of the handle.

As the handle is inserted into the shank $a$ the pin $e$ presses the free end of the spring-arm $b$ outward until the handle is fully inserted within the shank, when the pin reaches the perforation $b'$, whereupon the spring-arm flies back into its normal position and the shovel is securely fastened upon the handle ready for use.

It is evident that the above-described mechanism would be equally efficient if the pin $e$ were mounted upon the spring-arm $b$ and there were a hole in the handle at the point where the pin $e$ is located, and I therefore do not limit myself to the form shown.

While I have illustrated and described merely an ice-spud and a shovel, I do not wish to be understood as limiting my invention to such implements, as it is obvious that the invention will be equally efficient with a number of tools of various kinds.

It is obvious that a handle with an ice-spud attached to its lower end constructed according to this invention may be used with a variety of interchangeable tools, each of which would be provided with a hollow shank adapted to receive the lower end of the handle, as hereinbefore described, and the advantages of such arrangements arising through convenience and cheapness will be easily appreciated.

What I claim, and desire to secure by Letters Patent, is—

1. In a device of the class described, the combination with a handle carrying an ice-spud at its lower end, of a shovel, and means for detachably securing the spud-handle to the shovel.

2. In a device of the class described, the combination with a handle carrying an ice-spud, of a shovel-blade provided with a hollow shank to receive the lower end of the spud-handle, a pocket in the shovel-blade for receiving the spud when the handle is inserted within the shank, and means for locking the handle and shovel-blade together.

3. In a device of the class described, the combination with a handle carrying a spud, said handle provided with a pin located near the lower end thereof, of a shovel-blade having a hollow shank to receive the lower end of the handle, said shank carrying a spring-arm which is provided with a perforation near the upper end thereof, to receive the pin and thereby securely lock the handle and blade together.

4. In a device of the class described, the combination with a shovel-blade provided with a hollow shank open at its rear side, of a handle adapted to engage the hollow shank and having a curved neck passing through the opening in the rear of the shank, and a spud on the outer end of the curved neck.

In witness whereof I affix my signature in the presence of two witnesses.

WM. J. ESTER.

Witnesses:
JOHN WARRANT CASTLEMAN,
DENNIS G. KAVANAGH.